United States Patent
Wang et al.

(10) Patent No.: US 7,171,664 B2
(45) Date of Patent: Jan. 30, 2007

(54) CONTENT MANAGEMENT SYSTEM AND METHOD OF EMPLOYING EXTENSIBLE WORKFLOW ENTITIES WITH USER-DEFINED ATTRIBUTES IN AN OBJECT-ORIENTED FRAMEWORK

(75) Inventors: Fang-Yi Wang, San Jose, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 10/319,575

(22) Filed: Dec. 16, 2002

(65) Prior Publication Data

US 2004/0117795 A1    Jun. 17, 2004

(51) Int. Cl.
*G06F 9/46* (2006.01)
*G06F 9/00* (2006.01)

(52) U.S. Cl. .......................... 718/100; 715/735; 705/8
(58) Field of Classification Search ................ 718/100, 718/102, 106; 715/733–738; 705/1, 7–11
See application file for complete search history.

(56) References Cited

U.S. PATENT DOCUMENTS

| | | | |
|---|---|---|---|
| 5,706,452 A | 1/1998 | Ivanov | |
| 6,006,193 A | 12/1999 | Gibson et al. | |
| 6,026,399 A | 2/2000 | Kohavi et al. | |
| 6,424,948 B1 | 7/2002 | Dong et al. | |
| 6,442,546 B1 | 8/2002 | Biliris et al. | |
| 7,032,225 B2 | 4/2006 | Wang et al. | |
| 2002/0052769 A1 | 5/2002 | Navani et al. | |

FOREIGN PATENT DOCUMENTS

EP    0 903 678 B1    3/1999
WO    WO 01/59626 A1    8/2001

*Primary Examiner*—Thomas Lee
*Assistant Examiner*—Suresh K Suryawanshi
(74) *Attorney, Agent, or Firm*—Karna Nisewaner

(57) ABSTRACT

An object-oriented framework is provided for managing the definition of user-defined attributes for workflow entities and storing and retrieving the values of those attributes. A set of APIs are introduced to manage the creation, deletion, and retrieval of user specified attribute definitions. In addition, extension objects are introduced to accommodate the storing and retrieving of values of user-defined attributes. This mechanism for allowing a user to extend the attributes of workflow entities enables customization of a workflow system to particular applications.

13 Claims, 10 Drawing Sheets

**WORKFLOW ENTITY
SYSTEM ATTRIBUTES**

```
SYSTEM ATTRIBUTE 1
SYSTEM ATTRIBUTE 2
SYSTEM ATTRIBUTE 3
SYSTEM ATTRIBUTE 4
        ⋮
SYSTEM ATTRIBUTE n
```

FIG.3A

**WORKFLOW ENTITY
SYSTEM AND
USER-DEFINED ATTRIBUTES**

```
SYSTEM ATTRIBUTE 1
SYSTEM ATTRIBUTE 2
SYSTEM ATTRIBUTE 3
SYSTEM ATTRIBUTE 4
        ⋮
SYSTEM ATTRIBUTE n
───────────────────────
USER-DEFINED ATTRIBUTE 1
        ⋮
USER-DEFINED ATTRIBUTE m
```

FIG.3B

| ATTRIBUTE NAME | ATTRIBUTE TYPE |
|---|---|
| USER ATTR1 | DK_CM_SHORT |
| USER ATTR2 | DK_CM_CHAR |
| USER ATTR3 | DK_CM_SHORT |
| USER ATTR4 | DK_CM_CHAR |
| USER ATTR5 | DK_CM_SHORT |
| USER ATTR6 | DK_CM_CHAR |

WORK NODE ENTITY
(DKWorkNodeICM)

WORK NODE ENTITY WITH
TWO USER-DEFINED ATTRIBUTES;
USER ATTR1 AND USER ATTR2

PROCESS ENTITY
(DKProcessICM)

PROCESS ENTITY WITH
TWO USER-DEFINED ATTRIBUTES;
USER ATTR3 AND USER ATTR4

ROUTE LIST ENTRY ENTITY
(DKRouteListEntryICM)

ROUTE LIST ENTRY ENTITY WITH
TWO USER-DEFINED ATTRIBUTES;
USER ATTR5 AND USER ATTR6

CONTENT MANAGEMENT SYSTEM AND METHOD OF EMPLOYING EXTENSIBLE WORKFLOW ENTITIES WITH USER-DEFINED ATTRIBUTES IN AN OBJECT-ORIENTED FRAMEWORK

BACKGROUND OF THE INVENTION

1. Technical Field

The present invention pertains to electronic document routing within a network or content management system, such as the system disclosed in U.S. Pat. application Ser. No. 10/131,167, entitled "Object-Oriented Framework for Document Routing Service in a Content Management System" and filed Apr. 23, 2002, now U.S. Pat. No. 7,032,225, the disclosure of which is incorporated herein by reference in its entirety. In particular, the present invention pertains to a content management system and method employing extensible workflow entities with user-defined attributes.

2. Discussion of the Related Art

A content management system basically stores content, preferably in digital form (e.g., images, videos, audio, text, etc.), and provides indexing functions in order to store and retrieve information based on various attributes. Document routing is an important and indispensable component to a content management system. Without the document routing capability, the content management system would merely become a document archival system. Document routing is similar to workflow and enables a document to be routed through various processing steps or phases in order to perform a business or other type of process. For example, when a claim is submitted to an insurance company for an auto accident, finite stages or routings are required to obtain the necessary approvals for paying the insurance claim, depending on the type of claim or damage incurred. Document routing must be capable of identifying a sequence of finite steps through which the document is routed in order to complete the claim processing.

The aforementioned patent provides an object-oriented framework for document routing service in a content management system. According to that patent, the object-oriented framework directly provides a server API set for document routing to the application programmers, without an intermediate interface (e.g.C API layer.) The object-oriented framework further defines the overall architectual design of document routing and the object model of the document routing service that includes a set of classes and associated methods to support the model. The object-oriented framework presents several advantages among which are that it provides the document routing function to users based on an object-oriented framework, and it enables application development with document routing service. with document routing service.

However, workflow functions supporting document routing in content management systems generally do not permit the workflow entities to be extensible. By way of example, IBM Content Manager Version includes two workflow entities, namely workflows and workbaskets. Since these entities include a fixed set of predefined attributes, a user is limited to the fixed attributes and is unable to customize or add user-defined attributes to the entities. For example, a workflow may include several attributes, such as an attribute indicating the name of the workflow, an attribute indicating the name of an access control list (ACL), an attribute indicating a route list of workbaskets, etc. Since an entity includes a predefined set of attributes, a user is unable to add new attributes to the workflow entity to store custom data, such as department number or owner name. Similarly, a user is unable to add new attributes to a workbasket to store custom data, such as account number and client classification, due to the predefined attributes of a workbasket. Thus, individual companies utilizing this type of content management system are required to utilize identical workflow entities even though the workflow within each company may be substantially different.

OBJECTS AND SUMMARY OF THE INVENTION

Accordingly, it is an object of the present invention to enable a user to customize and define attributes for workflow entities to adapt the entities for various applications.

It is another object of the present invention to employ extensible workflow entities with user-defined attributes in an object-oriented framework for a content management system.

The aforesaid objects may be achieved individually and/or in combination, and it is not intended that the present invention be construed as requiring two or more of the objects to be combined unless expressly required by the claims attached hereto.

According to the present invention, an object-oriented framework is provided for managing the definition of user-defined attributes for workflow entities and storing and retrieving the values of those attributes. A set of APIs are introduced to manage the creation, deletion, and retrieval of user specified attribute definitions. In addition, extension objects are introduced to accommodate the storing and retrieving of values of user-defined attributes. This mechanism for allowing a user to extend the attributes of workflow entities enables customization of a workflow system to particular applications. For example, Company A and Company B may use the present invention for their respective workflow applications. Company A may customize the workflow entities to meet unique business requirements, while Company B may define a different set of attributes for that company workflow entities.

The present invention provides several advantages to Information Technology (IT) departments of corporations and to business partners and vendors who may easily customize solutions to meet requirements of their clients. Although the present invention is described by way of example with respect to content management systems, the present invention may be applied to other systems or products.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

BRIEF DESCRIPTION OF THE DRAWINGS

FIGS. 3A–3B are block diagrams illustrating system and user-defined attributes for workflow entities, respectively.

DETAILED DESCRIPTION OF THE PREFERRED EMBODIMENTS

Figure 1:
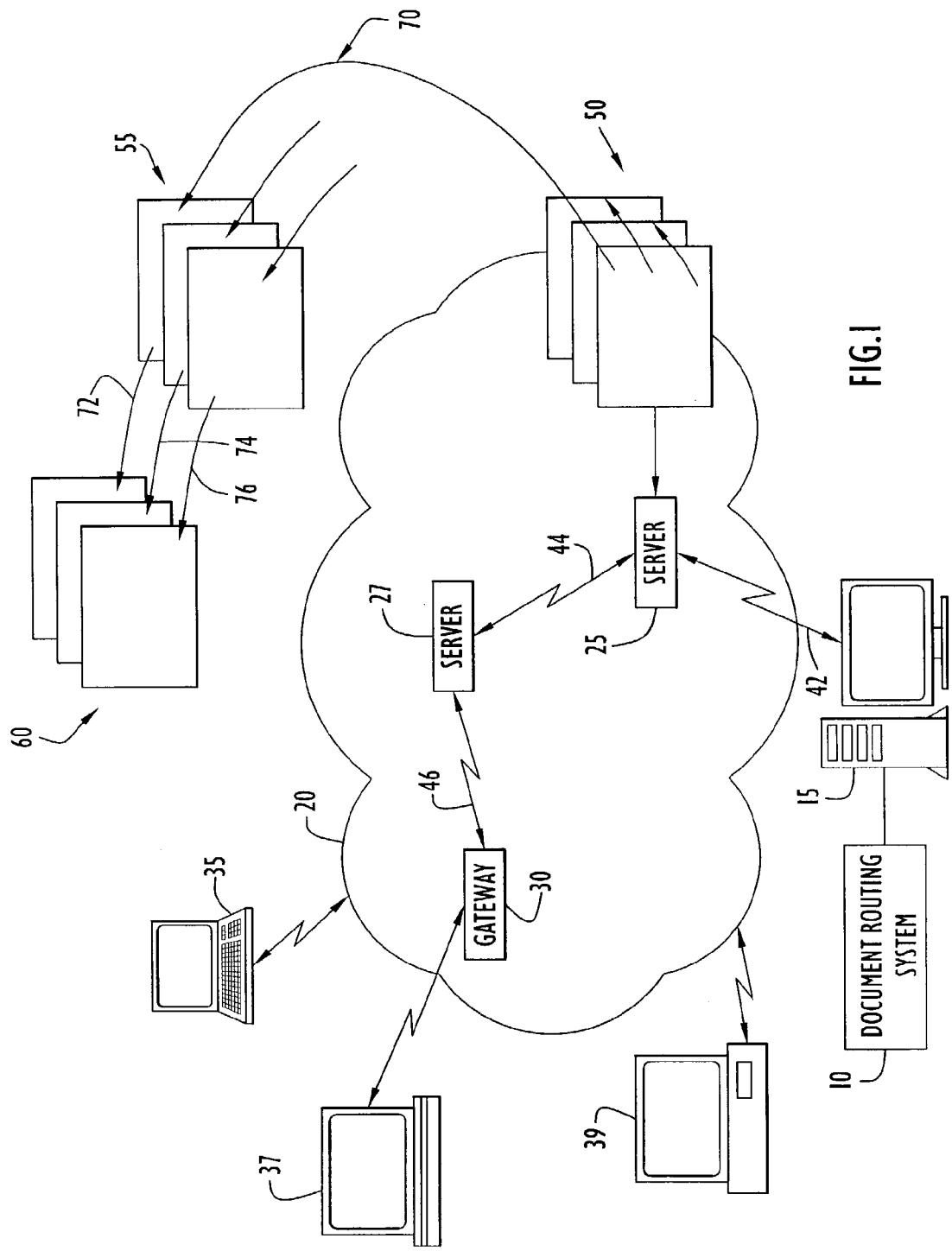
FIG. 1 is a schematic illustration of an exemplary system employing the present invention with respect to a document routing system for a content management system.

An exemplary system employing the present invention with respect to a document routing system 10 to enable workflow entities to include user-defined attributes is illustrated in FIG. 1. Specifically, document routing system 10 typically forms part of a content management system and includes a software or computer program module that is typically embedded within or installed on a host server computer system 15. Alternatively, document routing system 10 may be stored on a suitable storage medium, such as a diskette, a CD, DVD, a hard drive, or like devices. The document routing system may be utilized in connection with the Internet (e.g., a collection of interconnected public and private computer networks that are linked together with routers by a set of standard protocols to form a global, distributed network) or other network, or with a stand-alone database of documents or other text sources that may have been derived from the Internet and/or other sources. A document may be any item that can be electronically digitized, including audio, video, pictures, text, etc.

A communication network 20 includes communication lines and switches connecting server computer systems, such as servers 25, 27, to gateways, such as gateway 30. Servers 25, 27 and gateway 30 provide communication access to the Internet. Users, such as remote Internet users, are represented by a variety of computer systems, such as computer systems 35, 37, 39, and may query host server 15 for desired information. The host server is connected to network 20 via a communications link, such as a telephone, cable, or satellite link. Servers 25, 27 can be connected via high speed Internet network lines 44, 46 to other computer systems and gateways and provide access to stored information, such as hypertext or web documents indicated generally at 50, 55, and 60. Hypertext documents 50, 55, 60 typically include embedded hypertext links to other locally stored pages, and hypertext links 70, 72, 74, 76 to other web sites or documents 55, 60 that are stored by various web servers, such as server 27. The various server, user and gateway computer systems may be implemented by any conventional personal or other computer or processing system (e.g., IBM-compatible, lap top, Macintosh, etc.) including a base (e.g., with the processors, memory and communication devices, etc.) and optional display and input devices (e.g., mouse, etc.). The computer systems may employ any conventional or other platform or operating system (e.g., Windows, Unix, Linux, etc.) and typically include appropriate software for communications and/or document routing functions.

Figure 2:
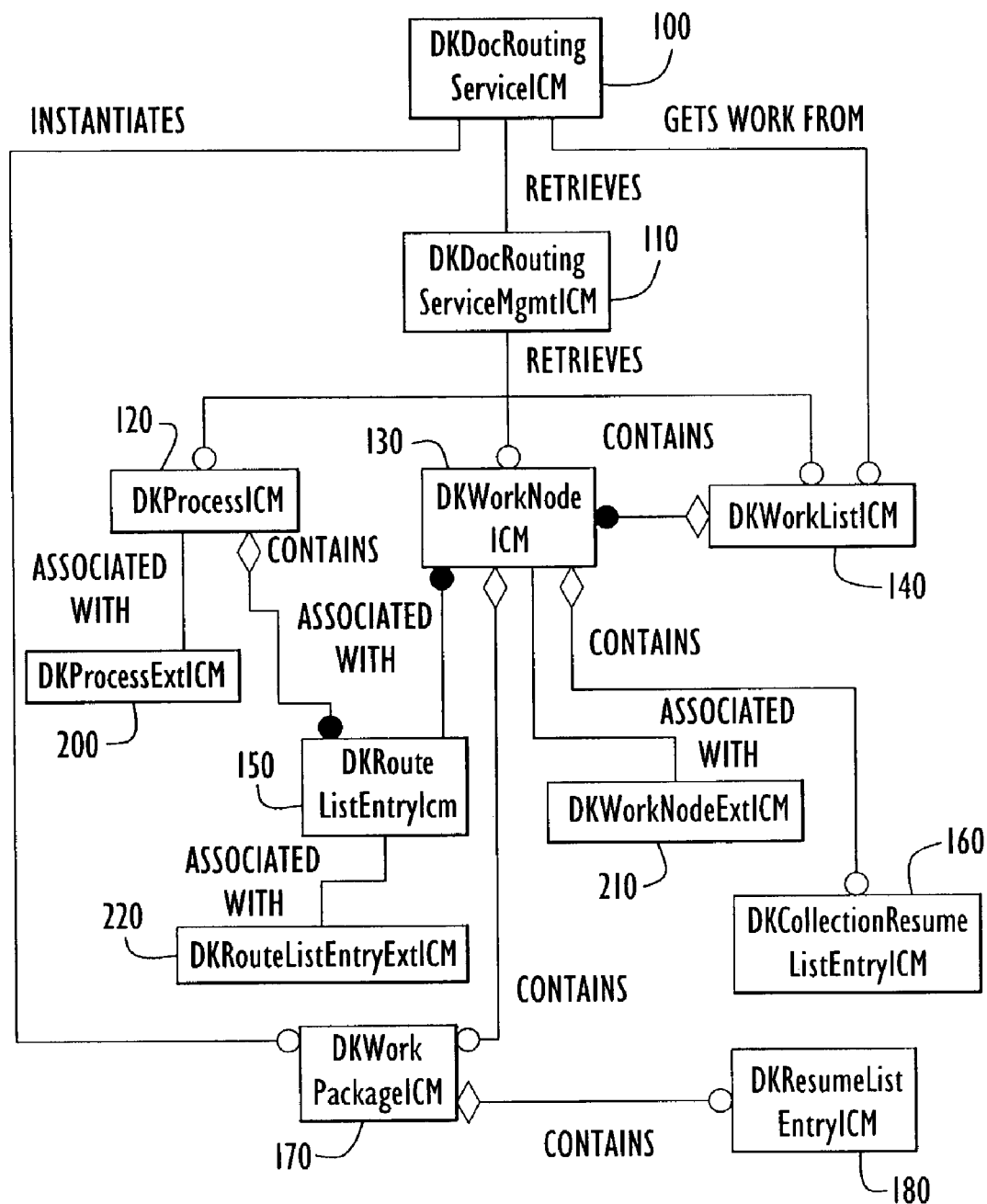
FIG. 2 is a hierarchical block diagram of the high-level architecture of the document routing system facilitating user-defined attributes for entities according to the present invention.

A high-level architecture of object-oriented document routing system 10 is illustrated in FIG. 2. Initially, the architecture is similar to the architecture disclosed in the aforementioned patent except that the present invention includes modified and/or additional components to facilitate user-defined attributes for workflow entities as described below. Specifically, document routing system 10 includes the following classes. A class is basically a user-defined data type that defines a collection of objects that share the same characteristicts. An object, or class member, is one instance of the class, where the initial values of its instance variables are assigned when an instance is created. Concrete classes are designed to be instantiated or, in other words, created as an object of a specific class.

DKDocRoutingServiceICM 100 is the main class that provides document routing functions.

DKDocRoutingServiceMgmtICM 110 provides system administration support for document routing.

DKProcessICM 120 is an object oriented representation of a process in document routing. A process generally refers to a series of steps defined by an administrator through which a document is routed.

DKWorkNodeICM 130 is an object orientation representation of a work node in document routing. A work node typically represents a step within a process.

DKWorkListICM 140 is an object oriented representation of a work list in document routing. A work list is generally a filter of one or more work nodes from which a user obtains a list of work or the "next" work item.

DKRouteListEntryICM 150 is an object oriented representation of an entry of the route list in a process in document routing.

DKCollectionResumeListEntryICM 160 is an object oriented representation of an entry of the resume list in a work node.

DKWorkPackageICM 170 is an object oriented representation of a work package in document routing. A work package is basically a routing element that includes a set of information, such as priority, state, resume time, and item ID being routed. This object is basically routed between work nodes in a process.

DKResumeListEntryICM 180 is an object oriented representation of an entry of the resume list in a work package.

DKDocRoutingServiceICM class 100 is the main gateway for document routing and provides the basic routing service such as starting, terminating, continuing, suspending, and resuming a process. The DKDocRoutingServiceICM class 100 allows the user to navigate to a finite number of classes associated with the document. Any object-oriented language, such as Java or C++, can be used to interpret the classes of system 10.

From the DKDocRoutingServiceICM class 100, a user can retrieve the DKDocRoutingServiceMgmtICM class 110 that provides system administration support for document routing and methods or procedures to manage three main classes or modules: DKProcessICM 120, DKWorkNodeICM 130, and DKWorkListICM 140. A method in the object-oriented context is a procedure that is executed when an object receives a message. In other words, a method is similar to a procedure, function, or routine in procedural programming languages. The only difference is that in object-oriented programming, a method is always associated with a class.

The DKProcessICM class 120 allows the user to define a routing process for a document. It contains a collection of route entries that is defined by the DKRouteListEntryICM class 150. The DKRouteListEntryICM class 150 is associated with a "From" or source work node and a "To" or target work node, represented by the DKWorkNodeICM class 130. For example, routing from nodes N1 to N3 via N2, the workflow would be from node N1 to N2, then from N2 to N3.

The DKWorkNodeICM class 130 is a step in the workflow process, representing only one work node. All the behavior of the nodes is contained in the DKWorkNodeICM class 130. For the example of a routing from node N1 to N3 via N2, three instances (i.e., objects) of the DKWorkNodeICM class 130 would be created. Using DKWorkNodeICM class 130, system 10 defines a sequence of work nodes in the route list. The routing sequence is called a process (e.g., Process PI).

The DKWorkNodeICM class 130 may contain a collection of the DKCollectionResumeListEntryICM class 160 that defines an entry in the resume list for the work node. When system 10 initiates a process, a work package is created that is defined by the DKWorkPackageICM class 170. The DKWorkPackageICM class 170 may contain a collection of the DKResumeListEntryICM class 180 that defines an entry in the resume list for the work package.

The DKWorkPackageICM class 170 is the basic routing element in the process. Each package is associated with one document; i.e., the package identifies the document. System 10 can view any number of items as a package or document; for example, a folder of documents, an MPEG file, a video, etc. The user specifies which process is required to create the package. The user may also define the work list from DKWorkListICM class 140, where L1 is the work list.

The DKWorkListICM class 140 operates as a filter mechanism and tracks or locates the package or document. From the previous example of routing a document from node N1 to N3 via N2, the package may be located at any of the three nodes in a worklist. To construct a worklist from the DKWorkListICM class 140, system 10 associates one or more work nodes with the worklist, L1. The system 10 tells the worklist which nodes to check, N1, N2, or N3. The user can query the system 10 for the location of the package against L1.

The entities for a workflow include a process, work node and route list entry. Each entity has a set of attributes describing its characteristics. This is analogous to a database table with multiple columns. An entity corresponds to a table, while an attribute corresponds to a table column. A process is basically a set of work nodes, serial or with branches, where a work node represents a location in a process where work (e.g., a work package or "container" of information, such as a pointer to the item or object being routed, priority, state, etc., where a work package advances from one work node to the next in a process) waits for events or processing. A route entry defines the directional flow from one work node to another work node. By way of example, the process, work flow and route list entry entities with corresponding attributes may be represented as follows.

---

Process (DKProcessICM)
Name: name of the process;
Description: description of the process;
ACLName: access control list name;
Route: a collection of route entries; and
LastChangedTime: a timestamp of last changed time.

---

The access control list (ACL) generally includes one or more user IDs or user groups and their associated privileges, where a user group includes one or more defined individual users identified by a single group name. The privileges generally relate to the right to access a specific object in a specific way and typically include rights, such as creating, deleting, and selecting objects stored in the system. Access control lists are utilized to control user access to data objects in the system.

---

Work Node (DKWorkNodeICM)
Type: type of the work node;
Name: name of the work node;
Description: description of the work node;
ACLName: access control list name;
TimeLimit: time interval a work package may reside in this work node;
OverloadLimit: a limit indicating the number of work packages that this work node may contain;
OverloadUserFunction: name of the user exit function to be invoked if an overload limit is reached;
OverloadUserDll: DLL name of the "overload" user exit;
EnterUserFunction: name of the user exit function to be invoked when a work package enters this work node;
EnterUserDll: DLL name for the "entering" user exit;
LeaveUserFunction: name of the user exit function to be invoked when a work package leaves this work node;
LeaveUserDll: DLL name for the "leaving" user exit; and
CollectionResumeList: resume list for collection point.

---

When a work package enters a work node in a process, this is considered an event that triggers an "entering" user function. This function is specified as an entity attribute with a function name and corresponding DLL name. When a work package leaves a work node in a process, this is considered an event that triggers a "leaving" user function. This function is specified as an attribute with function name and corresponding DLL name. Further, when a work node contains more than an expected number of work packages, this is considered an event that triggers an "overload" user function. This function is similarly specified as an entity attribute with function name and corresponding DLL name. A collection point is basically a work node where a document or folder (e.g., group of documents) waits for arrival of other items (e.g., zero or more items of one or more types for each document or folder type), while a resume list is a list of item types (i.e., document types) that the folder in a process is waiting for. Without the arrival of these documents, the process for the document or folder will be suspended.

---

Route List Entry (DKRouteListEntryICM)
From: name of the "FROM" work node;
To: name of the "TO" work node; and
Selection: name of the selection or branch.

---

The above entities typically include a set of fixed or predetermined attributes. This is represented by way of example in FIG. 3A. Basically, each entity includes a set of system attributes (e.g., labeled one to N). The present invention enables a user to customize the workflow entity by defining entity attributes. This is represented by way of example in FIG. 3B. In particular, the workflow entity includes the system attributes (e.g., labeled one to N) and a series of user-defined attributes (e.g., labeled one to M). The user-defined attributes may be any desired characteristic of a workflow. For example, user-defined attributes for a workflow entity may include character strings respectively indicating an E-mail address and a classification. If these attributes are defined for a process entity, the process entity includes additional attributes to store an E-mail address and a classification type. Accordingly, when a process is instantiated from this process entity, an E-mail address and a classification (e.g., confidential) can be stored in the process. An application program may retrieve these attribute values to send an E-mail and handle the process based on the classification type.

The present invention provides a set of APIs to manage the creation, deletion, and retrieval of user-specified attribute definitions. Further, extension objects are introduced that are each associated with a corresponding workflow entity (e.g., process, work node and route list entry) to maintain information for user-defined attributes and facilitate storage and retrieval of values for those attributes. In other words, the extension objects basically contain the user-defined attributes for a corresponding entity. In order to facilitate user-defined attributes for workflow entities, the present invention incorporates a set of APIs into the structure of FIG. 2. Specifically, the present invention manages the definition of user-defined attributes by modifying DKDocRoutingServiceMgmtICM class 110 to include additional procedures. The user-defined attribute information is typically maintained in tables or other structures within memory or databases that are accessible to the host server. These procedures, by way of example, may include the following.

```
class DKDocRoutingServiceMgmtICM
{
    ...
    ...
    void addProcessUserDefinedAttr(DKAttrDefICM attribute);
    void delProcessUserDefinedAttr(String attribute_name);
    void updateProcessUserDefinedAttr(DKAttrDefICM attribute);
    DKAttriDefCM retrieveProcessUserDefinedAttr(String attribute_
    name);
    String[] listProcessUserDefinedAttrs( );
    void addWorkNodeUserDefinedAttr(DKAttrDefICM attribute);
    void delWorkNodeUserDefinedAttr(String attribute_name);
    void updateWorkNodeUserDefinedAttr(DKAttrDefICM attribute);
    DKAttrDefICM retrieveWorkNodeUserDefinedAttr(String attribute_
    name);
    String[] list WorkNodeUserDefinedAttrs( );
    void addRouteListEntryUserDefinedAttr(DKAttrDefICM attribute);
    void delRouteListEntryUserDefinedAttr(String attribute_name);
    void updateRouteListEntryUserDefinedAttr(DKAttrDefICM
    attribute);
    DKAttrDefICM retrieveRouteListEntryUserDefinedAttr(String
    attribute_name);
    String[] listRouteListEntryUserDefinedAttrs( );
}
```

The void addProcessUserDefinedAttr(DKAttrDefICM attribute) procedure adds a user-defined attribute to a table including process information, where the parameter represents an attribute object to be added to that process table.

The void delProcessUserDefinedAttr(String attribute_name) procedure deletes a user-defined attribute from the process table, where the parameter represents the name of the attribute to be removed from the process table.

The void updateProcessUserDefinedAttr(DKAttrDefICM attribute) updates a user-defined attribute in the process table, where the parameter represents an attribute object to be updated in the process table.

The DKAttrDefICM retrieveProcessUserDefinedAttr (String attribute_name) procedure retrieves a user-defined attribute from the process table, where the parameter represents the name of a user-defined attribute to be retrieved from the process table.

The String[ ] listProcessUserDefinedAttrs( ) procedure retrieves an array of the names of all user-defined attributes from the process table and returns the array of user-defined attribute names as strings.

The void addWorkNodeUserDefinedAttr(DKAttrDefICM attribute) procedure adds a user-defined attribute to a table including work node information, where the parameter represents an attribute object to be added to that work node table.

The void delWorkNodeUserDefinedAttr(String attribute_name) procedure deletes a user-defined attribute from the work node table, where the parameter represents the name of the attribute to be removed from the work node table.

The void updateWorkNodeUserDefinedAttr(DKAttrDefICM attribute) procedure updates the definition of a user-defined attribute in the work node table, where the parameter represents an attribute object to be updated in the work node table.

The DKAttrDefICM retrieveWorkNodeUserDefinedAttr (String attribute_name) procedure retrieves the definition of a user-defined attribute from the work node table, where the parameter represents the name of a user-defined attribute to be retrieved from the work node table.

The String[ ] listWorkNodeUserDefinedAttrs( ) lists the names of all user-defined attributes from the work node table and returns an array of user-defined attribute names.

The void addRouteListEntryUserDefinedAttr(DKAttrDefICM attribute) procedure adds a user-defined attribute to a table including routing step information, where the parameter represents an attribute object to be added to that routing steps table.

The void delRouteListEntryUserDefinedAttr(String attribute_name) procedure deletes a user-defined attribute from the routing steps table, where the parameter represents the name of the attribute to be removed from the routing steps table.

The void updateRouteListEntryUserDefinedAttr(DKAttrDefICM attribute) procedure updates the definition of a user-defined attribute in the routing steps table, where the parameter represents an attribute object to be updated in the routing steps table.

The DKAttrDefICM retrieveRouteListEntryUserDefinedAttr(String attribute_name) procedure retrieves a user-defined attribute from the routing steps table, where the parameter represents the name of a user-defined attribute to be retrieved from the routing steps table.

The String[ ] listRouteListEntryUserDefinedAttrs( ) procedure retrieves an array of the names of all the user-defined attributes from the routing steps table and returns the array of user-defined attribute names as strings.

The storage and retrieval of user-defined attribute values is accomplished by the present invention by modifying DKProcessICM class 120, DKWorkNodeICM class 130 and DKRouteListEntryICM class 150 to include additional procedures as described below and providing additional classes. These additional classes include DKProcessExtICM class 200, DKWorkNodeExtICM class 210 and DKRouteListEntryExtICM class 220. DKProcessExtICM class 200 is associated with DKProcessICM class 120 and basically accommodates user-defined attributes for a process workflow entity, while DKWorkNodeExtICM class 210 is associated with DKWorkNodeICM class 130 and basically accommodates user-defined attributes for a work node workflow entity. DKRouteListEntryExtICM class 220 is associated with DKRouteListEntryICM class 150 and basically accommodates user-defined attributes for a route list entry workflow entity. The additional procedures and classes, by way of example, may include the following.

```
class DKProcessICM
{
    ...
    ...
    DKProcessExtICM getExtension( );
    void setExtension(DKProcessExtICM extension);
}
```

The DKProcessExtICM getextension( ) procedure retrieves an extension object associated with a process object. A DKProcessExtICM object contains a collection of DKNVPair objects, each of which has a name as a user-defined attribute name and a value as the corresponding user-defined attribute value for the process object. The procedure returns a process extension object that is as an instance of the DKProcessExtICM class and associated with the process.

The public void setExtension(DKProcessExtICM ext) procedure sets the extension object for a process object. DKProcessExtICM contains a collection of DKNVPair objects, each of which has name as a user-defined attribute name and a value as the corresponding user-defined attribute value for this process object. The procedure parameter represents a process extension object (as an instance of the DKProcessExtICM class) to be associated with the process object.

```
class DKWorkNodeICM
{
    ...
    ...
    DKWorkNodeExtICM getExtension( );
    void setExtension(DKWorkNodeExtICM extension);
}
```

The public DKWorkNodeExtICM getExtension( ) procedure retrieves an extension object associated with a work node object. A DKWorkNodeExtICM object contains a collection of name-value pairs as instances of DKNVPair objects, each of which has a name as a user-defined attribute name and a value as the corresponding user-defined attribute value for the work node object. This procedure returns a work node extension object that is an instance of the DKWorkNodeExtICM class and associated with the work node.

The public void setExtension(DKWorkNodeExtICM ext) procedure sets the extension object associated with a work node object. A DKWorkNodeExtICM object contains a collection of name-value pairs as instances of DKNVPair, each of which has a name as a user-defined attribute name and a value as the corresponding user-defined attribute value for this work node object. The procedure parameter represents a work node extension object (as an instance of the DKWorkNodeExtICM class) to be associated with the work node object.

```
class DKRouteListEntryICM
{
    ...
    ...
```

```
    DKRouteListEntryExtICM getExtension( );
    void setExtension(DKRouteListEntryExtICM extension);
}
```

The public DKRouteListEntryExtICM getExtension( ) procedure retrieves a reference to the extension object associated with a route list entry object. A DKRouteListEntryExtICM object contains a collection of name-value pairs as instances of DKNVPair, each of which has a name as a user-defined attribute name and a value as the corresponding user-defined attribute value for the route list entry object. This procedure returns a route list entry extension object that is an instance of the DKRouteListEntryExtICM class and associated with the route list entry object.

The public void setExtension(DKRouteListEntryExtICM ext) procedure sets the extension object associated with a route list entry object. A DKRouteListEntryExtICM object contains a collection of name-value pairs as instances of DKNVPair, each of which has a name as a user-defined attribute name and a value as the corresponding user-defined attribute value for the route list entry object. The procedure parameter represents a route list entry extension object (as an instance of the DKRouteListEntryExtICM class) to be associated with the route list entry object.

```
class DKProcessExtICM
{
    DKProcessExtICM( );
    dkCollection getUserDefinedAttrValue( );
    void setUserDefinedAttrValue(dkCollection collection);
}
```

The DKProcessExtICM class represents a process extension class to accommodate user-defined attributes for process entities.

The public DKProcessExtICM( ) procedure is the default constructor for the process extension class and constructs and initializes a process extension instance.

The public dkCollection getUserDefinedAttrValue( ) procedure retrieves a collection of user defined attributes and their values for an associated process and returns a collection of name-value pairs as instances of DKNVPair.

The public void setUserDefinedAttrValue(dkCollection collection) procedure sets the values for user-defined attributes for the process associated with a process extension object, where the parameter represents a collection of name-value pairs as instances of DKNVPair.

```
class DKWorkNodeExtICM
{
    DKWorkNodeExtICM( );
    dkCollection getUserDefinedAttrValue( );
    void setUserDefinedAttrValue(dkCollection collection);
}
```

The DKWorkNodeExtICM class represents a work node extension class to accommodate user-defined attributes for work node entities.

The public DKWorkNodeExtICM( ) procedure is the default constructor for the work node extension class and constructs and initializes a work node extension instance.

The public dkCollection getUserDefinedAttrValue( ) procedure retrieves a collection of user defined attributes and their values for the work node associated with a work node extension object and returns a collection of name-value pairs as instance of DKNVPair.

The public void setUserDefinedAttrValue(dkCollection collection) procedure sets the values for user-defined attributes for the work node associated with a work node extension object, where the parameter represents a collection of name-value pairs as instances of DKNVPair.

```
class DKRouteListEntryExtICM
{
  DKRouteListEntryExtICM( );
  dkCollection getUserDefinedAttrValue( );
  void setUserDefinedAttrValue(dkCollection collection);
}
```

The DKRouteListEntryExtICM class represents a route list entry extension class to accommodate user-defined attributes for route list entry entities.

The public DKRouteListEntryExtICM( ) procedure is the default constructor for the route list entry extension class and constructs and initializes a route list entry extension instance.

The public dkCollection getUserDefinedAttrValue( ) procedure retrieves a collection of user defined attributes and their values for a route list entry associated with a route list entry extension object and returns a collection of name-value pairs as instances of DKNVPair.

The public void setUserDefinedAttrValue(dkCollection collection) procedure sets the collection of values for user-defined attributes for the route list entry object associated with a route list entry extension object, where the parameter represents a collection of name-value pairs as instances of DKNVPair.

Figure 4:
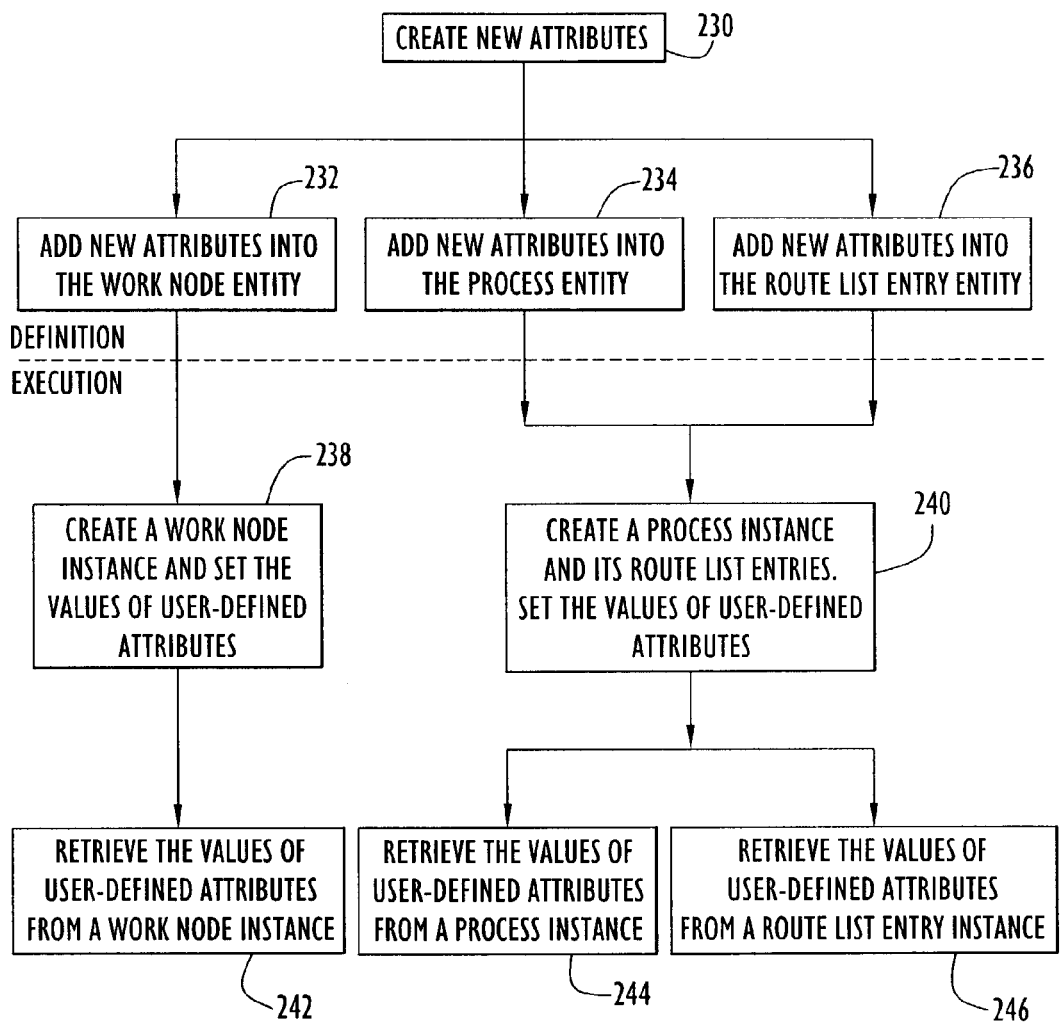
FIG. 4 is a procedural flow chart illustrating the manner in which user-defined attributes are defined and executed according to the present invention.

The manner in which attributes for workflow entities are defined and executed is illustrated in FIG. 4. Initially, new attributes are created for workflow entities at step 230. This may be accomplished by the following exemplary Java software which creates six user-defined attributes and utilizes common libraries, defined variables and the classes and/or procedures described above. However, any quantity of attributes may be defined in substantially the same manner.

```
DKDocRoutingServiceMgmtICM    docMgmt    =    new
DKDocRoutingServiceMgmtICM(dsICM);
    DKDatastoreDefICM dsDef = (DKDatastoreDefICM) dsICM.
    datastoreDef( );
    DKAttrDefICM attr1 = (DKAttrDefICM) dsDef.retrieveAttr
    ("UserAttr1");
    if (attr1 == null) {
        attr1 = new DKAttrDefICM(dsICM);
        attr1.setName("UserAttr1");
        attr1.setDescription("This is UserAttr1");
        attr1.setType(DK_CM_SHORT);
        attr1.setUnique(false);
        attr1.setNullable(true);
        attr1.add( );
        System.out.println("Done adding attr1");
    }
    DKAttrDefICM attr2 = (DKAttrDefICM) dsDef.retrieveAttr
    ("UserAttr2");
    if (attr2 == null) {
        attr2 =new DKAttrDefICM(dsICM);
```

-continued

```
        attr2.setName("UserAttr2");
        attr2.setDescription("This is UserAttr2");
        attr2.setType(DK_CM_CHAR);
        attr2.setSize(200);
        attr2.setUnique(false);
        attr2.setNullable(true);
        attr2.add( );
        System.out.println("Done adding attr2");
    }
    DKAttrDefICM attr3 = (DKAttrDefICM) dsDef.retrieveAttr
    ("UserAttr3");
    if (attr3 == null) {
        attr3 =new DKAttrDefICM(dsICM);
        attr3.setName("UserAttr3");
        attr3.setDescription("This is UserAttr3");
        attr3.setType(DK_CM_SHORT);
        attr3.setUnique(false);
        attr3.setNullable(true);
        attr3.add( );
        System.out.println("Done adding attr3");
    }
    DKAttrDefICM attr4 = (DKAttrDefICM) dsDef.retrieveAttr
    ("UserAttr4");
    if (attr4 == null) {
        attr4 =new DKAttrDefICM(dsICM);
        attr4.setName("UserAttr4");
        attr4.setDescription("This is UserAttr4");
        attr4.setType(DK_CM_CHAR);
        attr4.setSize(200);
        attr4.setUnique(false);
        attr4.setNullable(true);
        attr4.add( );
        System.out.println("Done adding attr4");
    }
    DKAttrDefICM attr5 = (DKAttrDefICM) dsDef.retrieveAttr
    ("UserAttr5");
    if (attr5 == null) {
        attr5 =new DKAttrDefICM(dsICM);
        attr5.setName("UserAttr5");
        attr5.setDescription("This is UserAttr5");
        attr5.setType(DK_CM_SHORT);
        attr5.setUnique(false);
        attr5.setNullable(true);
        attr5.add( );
        System.out.println("Done adding attr5");
    }
    DKAttrDefICM attr6 = (DKAttrDefICM) dsDef.retrieveAttr
    ("UserAttr6");
    if (attr6 == null) {
        attr6 =new DKAttrDefICM(dsICM);
        attr6.setName("UserAttr6");
        attr6.setDescription("This is UserAttr6");
        attr6.setType(DK_CM_CHAR);
        attr6.setSize(200);
        attr6.setUnique(false);
        attr6.setNullable(true);
        attr6.add( );
        System.out.println("Done adding attr6");
    }
```

Figures 5, 6:
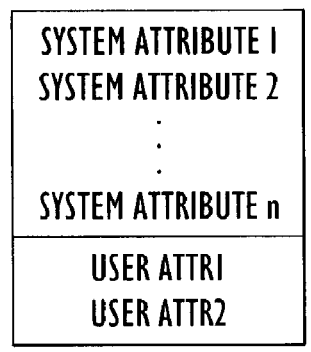
FIG. 5 is an exemplary list of user-defined attributes and their types.
FIGS. 6–8 are block diagrams illustrating exemplary system and user-defined attributes for work node, process and route list entry entities.

The resulting user-defined attributes and their corresponding types are illustrated in FIG. 5. The above steps represent the attribute definition phase.

Once the attributes are defined, the execution phase may be initiated where the attributes may be processed. Initially, the defined attributes are added into the workflow entities. In particular, the appropriate attributes are added to the work node workflow entity at step 232, to the process entity at step 234 and the route list entry entity at step 236. This may be accomplished by the following exemplary Java software which utilizes common libraries, defined variables and the classes and/or procedures described above.

```
docMgmt.addWorkNodeUserDefinedAttr(attr1);
    docMgmt.addWorkNodeUserDefinedAttr(attr2);
    DKAttrDefICM attr7 =
docMgmt.retrieveWorkNodeUserDefinedAttr("UserAttr1");
    System.out.println("work node: attr name = " + attr7.getName( ));
    String[] names1 = docMgmt.listWorkNodeUserDefinedAttrs( );
    for (int i = 0; i < names1.length; i++)
        System.out.println("work node: name = " + names1[i]);
```

The above software adds the first two attributes to the work node entity.

```
docMgmt.addProcessUserDefinedAttr(attr3);
    docMgmt.addProcessUserDefinedAttr(attr4);
    DKAttrDefICM attr8 = docMgmt.retrieveProcessUserDefinedAttr
    ("UserAttr3");
    System.out.println("process: attr name = " + attr8.getName( ));
    String[] names2 = docMgmt.listProcessUserDefinedAttrs( );
    for (int i = 0; i < names2.length; i++)
        System.out.println("process: name = " + names2[i]);
```

The above software adds the third and fourth attributes to the process entity.

```
docMgmt.addRouteListEntryUserDefinedAttr(attr5);
    docMgmt.addRouteListEntryUserDefinedAttr(attr6);
    DKAttrDefICM attr9 =
docMgmt.retrieveRouteListEntryUserDefinedAttr("UserAttr5");
    System.out.println("route list entry: attr name = " + attr9.
    getName( ));
    String[] names3 = docMgmt.listRouteListEntryUserDefinedAttrs( );
    for (int i = 0; i < names3.length; i++)
        System.out.println("route list entry: name = " + names3[i]);
```

The above software adds the fifth and sixth attributes to the route list entry entity.

Once the attributes have been added to the work node entity, a work node instance is created and the user-defined attribute values are set at step 238. This may be accomplished by the following exemplary Java software which utilizes common libraries, defined variables and the classes and/or procedures described above. The resulting entity is illustrated in FIG. 6 with system and user-defined attributes.

```
DKWorkNodeICM wn = new DKWorkNodeICM( );
    wn.setName("WN1");
    wn.setDescription("This is WN1");
    wn.setACLCode(1);
    wn.setTimeLimit(100);
    wn.setOverloadLimit(200);
    wn.setOverloadUserFunction("userFunction1");
    wn.setOverloadUserDll("userDLL1");
    wn.setType(0);
    DKWorkNodeExtICM wext = new DKWorkNodeExtICM( );
    dkCollection coll = new DKSequentialCollection( );
    coll.addElement(new DKNVPair("UserAttr1", new Short((short)
    95120)));
    coll.addElement(new DKNVPair("UserAttr2", "San Jose"));
    wext.setUserDefinedAttrValue(coll);
    wn.setExtension(wext);
    docMgmt.add(wn);
    System.out.println("Done adding WN1");
```

Figure 7:
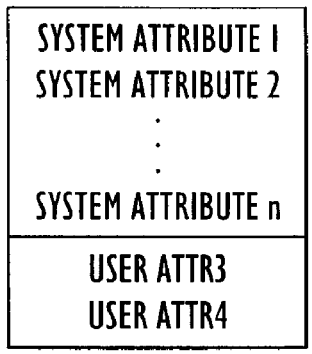
Figure 8:
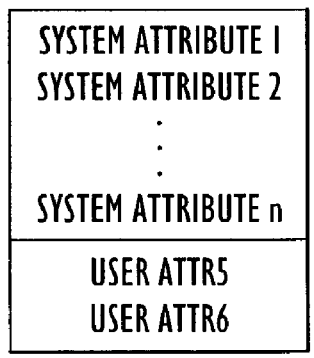

Similarly, once the attributes have been added to the process and route list entry entities, a process instance and corresponding route list entries are created and the user-defined attribute values are set at step 240. This may be accomplished by the following exemplary Java software which utilizes common libraries, defined variables and the classes and/or procedures described above. The resulting process and route list entry entities with system and user-defined attributes are respectively illustrated in FIGS. 7 and 8.

```
dkCollection routeColl = new DKSequentialCollection( );
DKProcessICM process1 = new DKProcessICM( );
process1.setName("P1");
process1.setDescription("This is Process1");
process1.setACLCode(1);
DKProcessExtICM pext = new DKProcessExtICM( );
dkCollection _coll = new DKSequentialCollection( );
_coll.addElement(new DKNVPair("UserAttr3", new Short((short)
95222)));
_coll.addElement(new DKNVPair("UserAttr4", "Los Angeles"));
pext.setUserDefinedAttrValue(_coll);
process1.setExtension(pext);
DKRouteListEntryICM route = new DKRouteListEntryICM( );
route.setFrom(DKConstantICM.DK_ICM_DR_START_NODE);
route.setTo("WN1");
route.setSelection("Continue");
DKRouteListEntryExtICM rext = new DKRouteListEntryExtICM( );
_coll = new DKSequentialCollection( );
_coll.addElement(new DKNVPair("UserAttr5", new Short((short)
76010)));
_coll.addElement(new DKNVPair("UserAttr6", "Dallas"));
rext.setUserDefinedAttrValue(_coll);
route.setExtension(rext);
routeColl.addElement(route);
route = new DKRouteListEntryICM( );
route.setFrom("WN1");
route.setTo(DKConstantICM.DK_ICM_DR_END_NODE);
route.setSelection("Continue");
rext = new DKRouteListEntryExtICM( );
_coll = new DKSequentialCollection( );
_coll.addElement(new DKNVPair("UserAttr5", new Short((short)
44444)));
_coll.addElement(new DKNVPair("UserAttr6", "Paris"));
rext.setUserDefinedAttrValue(_coll);
route.setExtension(rext);
routeColl.addElement(route);
process1.setRoute(routeColl);
docMgmt.add(process1);
System.out.println("Done adding P1");
```

During processing or execution of a process, the values of user-defined attributes may be retrieved from a work node instance at step 242 for various operations. This may be accomplished by the following exemplary Java software which utilizes common libraries, defined variables and the classes and/or procedures described above.

```
DKWorkNodeExtICM _ext = _wb.getExtension( );
    dkCollection _coll = _ext.getUserDefinedAttrValue( );
    dkIterator iter = _coll.createIterator( );
    while (iter.more( )){
        DKNVPair nv = (DKNVPair) iter.next( );
        System.out.println("    user-defined attr name = " + nv.
        getName( ));
        System.out.println("    user-defined attr value = " + nv.
        getValue( ));
    }
```

Similarly, the values of user-defined attributes may be retrieved from a process instance at step 244 by the following exemplary Java software which utilizes common libraries, defined variables and the classes and/or procedures described above.

```
DKProcessExtICM_pext = _p.getExtension( );
    dkCollection_coll1 = _pext.getUserDefinedAttrValue( );
    dkIterator iter = _coll1.createIterator( );
    while (iter.more( )){
        DKNVPair nv = (DKNVPair) iter.next( );
        System.out.println("   user-defined attr name = " + nv
        .getName( ));
        System.out.println("   user-defined attr value = " + nv.
        getValue( ));
    }
```

In addition, the values of user-defined attributes may be retrieved from a route list entry instance at step 246. This may be accomplished by the following exemplary Java software which utilizes common libraries, defined variables and the classes and/or procedures described above.

```
DKRouteListEntryExtICM_rext = _route.getExtension( );
    dkCollection_coll2 = _rext.getUserDefinedAttrValue( );
    dkIterator iter2 = _coll2.createIterator( );
    while (iter2.more( )){
        DKNVPair nv = (DKNVPair) iter2.next( );
        System.out.println("   user-defined attr name = " + nv.
        getName( ));
        System.out.println("   user-defined attr value = " + nv.
        getValue( ));
    }
```

Figure 9:
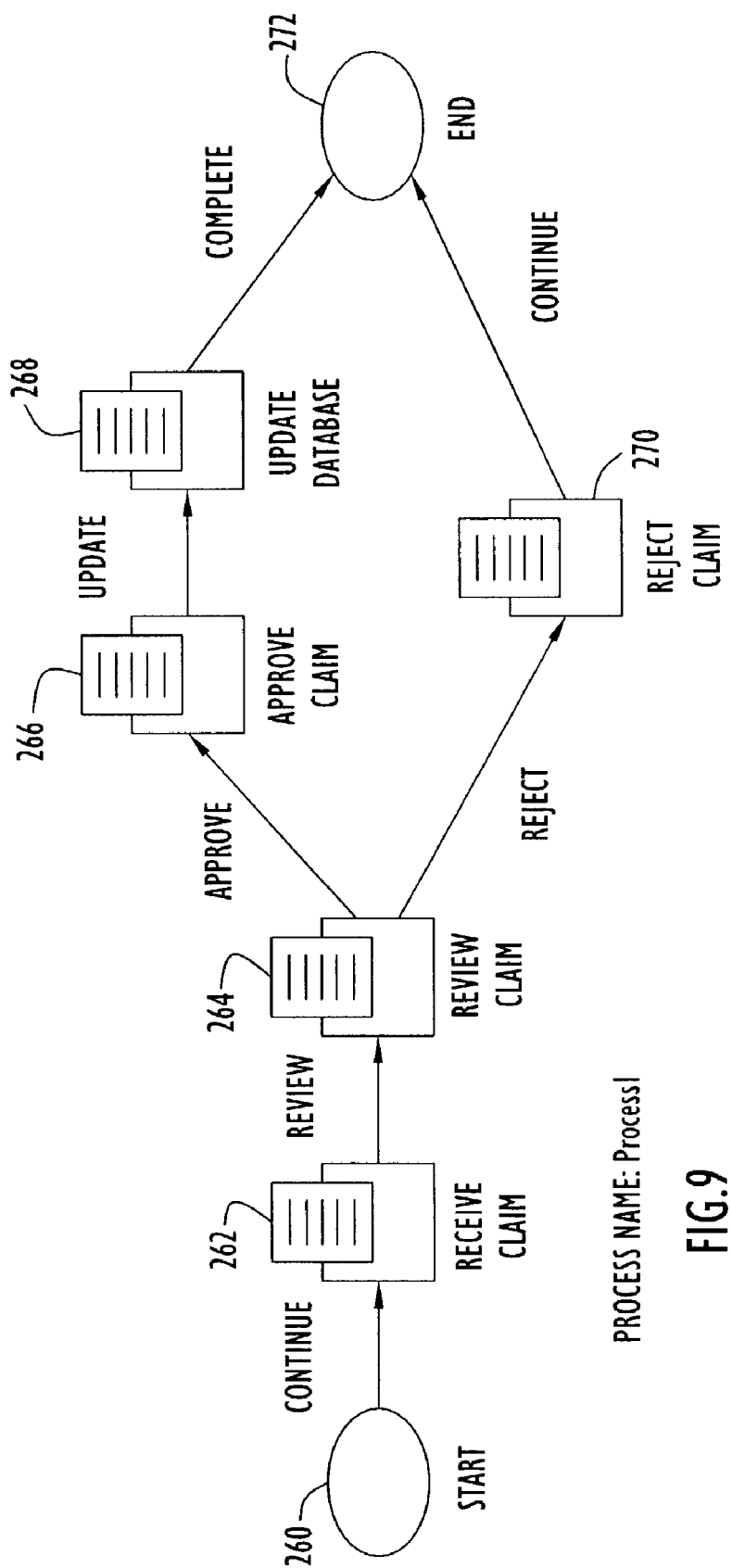
FIG. 9 is a diagrammatic illustration of an exemplary process or workflow.

The manner in which a workflow is defined and executed with respect to an exemplary process is illustrated in FIG. 9. Initially, the various workflow entities are defined. Work node entities are created first, and a process entity is subsequently defined with plural route entries. Each route entry includes the name of the "from" work node, the name of the "to" work node and a selection as a label representing a route or branch. By way of example, the illustrated process relates to processing of an insurance or other claim. The process includes a start work node 260, a receive claim work node 262, a review claim work node 264, an approve claim work node 266, an update database work node 268, a reject claim work node 270 and an end work node 272.

Initially, a user starts a process and adds values into system and user-defined attributes as described above. A work package is created as a routing element, and advances from one work node to another through the process. Basically, the process mirrors the actual processing of a claim document, where the document is routed to the appropriate nodes for processing. In particular, a claim document in a work package is initially routed to start work node 260 and follows the continue selection or branch to receive claim work node 262. The document is routed along the review branch to review claim work node 264, where the claim is reviewed for approval or rejection. As the claim document enters and leaves a work node, these events trigger invocation of various functions specified within the work node entity attributes as described above. Upon approval of a claim document, the document is routed to approve claim work node 266 via the approve branch. The claim document is processed for approval and is routed via the update branch to update database work node 268, where a database is updated. The document is routed via the completion branch to end work node 272. However, if the claim document is rejected at review claim work node 264, the document is routed to reject claim work node 270 via the reject branch, where the document is processed for rejection. The document is subsequently routed to end work node 272 via the continue branch. An exemplary route list entry entity for the process is shown below.

| From | To | Selection |
| --- | --- | --- |
| Start | ReceiveClaim | Continue |
| ReceiveClaim | ReviewClaim | Review |
| ReviewClaim | ApproveClaim | Approve |
| ReviewClaim | RejectClaim | Reject |
| ApproveClaim | UpdateDatabase | Update |
| UpdateDatabase | End | Complete |
| RejectClaim | End | Continue |

During traversal of the work package or document through the process, the user can retrieve the user-defined attributes and perform proper operations as described below. The user-defined attributes enable users to customize workflows and define attributes to perform various functions within a process (e.g., E-mail documents, transmit documents to facsimiles, etc., depending upon the desired attributes).

Figure 10:
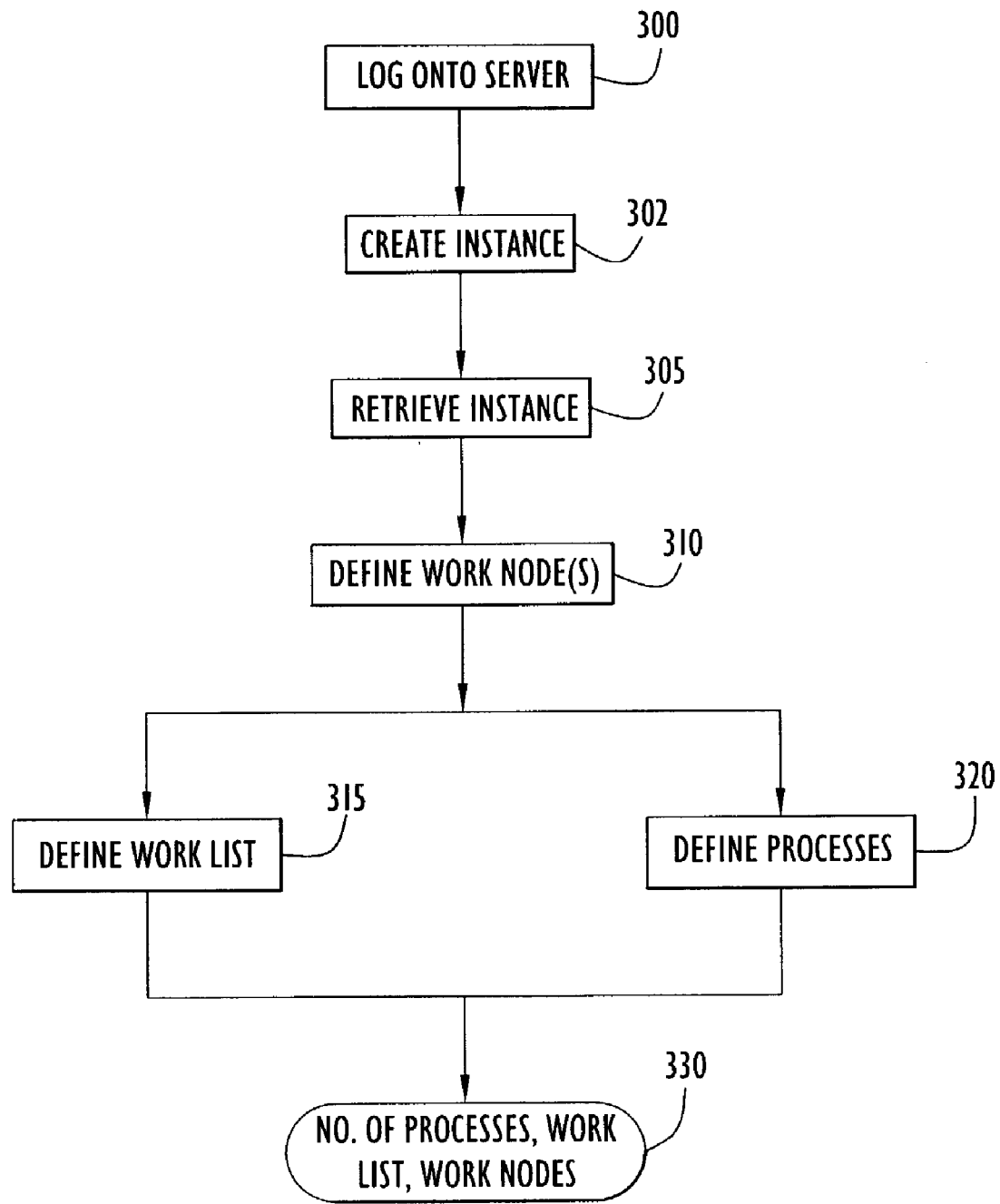
FIG. 10 is a procedural flow chart illustrating the manner in which document routing objects are created according to the present invention.

Operation of the document routing system is described with reference to FIG. 10. Initially, a user creates document routing objects by first logging onto host server 15 (FIG. 1) at step 300. The user creates an instance from DKDocRoutingServiceICM class 100 (FIG. 2) at step 302. The user then retrieves an instance from DKDocRoutingServiceMgmtICM class 110 at step 305.

At step 310, the user defines the number of work nodes from DKWorkNodeICM class 130 required to complete the process along with each work node in the process. The user then defines the work lists in DKWorkListICM class 140 at step 315 and defines the processes from DKProcessICM class 120 and DKRouteListEntryICM class 150 at step 320. The output of the method of creating document routing objects is the number of processes, the work list, and the number and definition of work nodes. Once the various entities are created, the user may define additional attributes for the process, work node and route list entry entities as described above.

Figure 11:
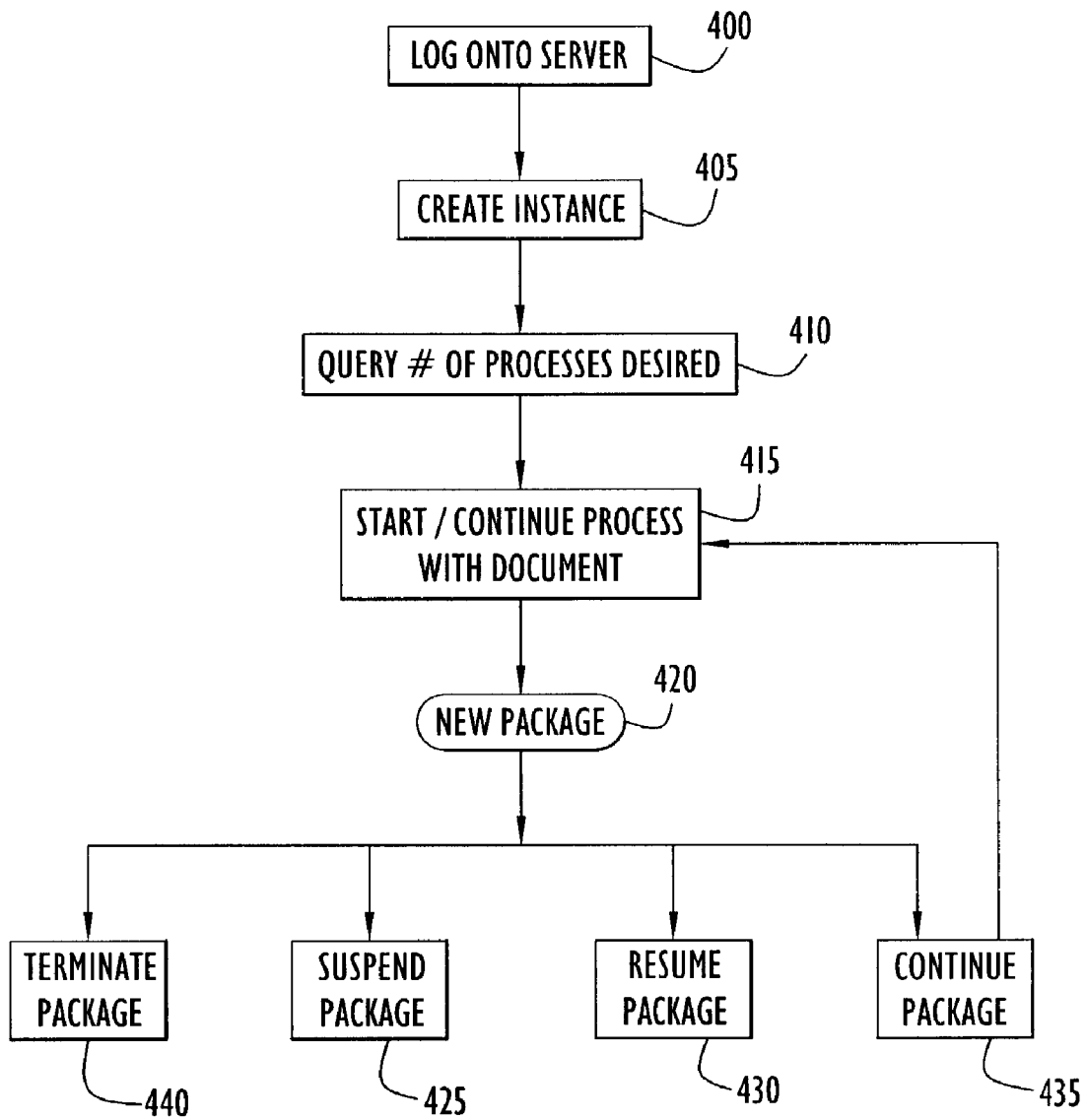
FIG. 11 is a procedural flow chart illustrating the manner in which a document routing process is executed according to the present invention.

The manner of executing a process for routing documents is illustrated in FIG. 11. Specifically, the user initiates process execution by first logging onto host server 15 (FIG. 1) at step 400 and creating an instance from DKDocRoutingServiceICM class 100 (FIG. 2) at step 405. The user queries how many processes are available at step 410.

Based on the process required, system 10 may start the process with a document at step 415. A work package is created at step 420 and transmitted to a work node. The process may suspend the package at step 425 in accordance with the user process definition. For example, the package may be suspended at a work node for a predetermined period of time, such as sixty minutes, or until a condition is met, such as the presence of a predetermined set of packages at that node. The criteria for suspension or resumption is defined by the DKResumeListEntryICM class 180. The process may be resumed at any time at step 430, allowing the package to continue through the process at step 435, thereby returning to step 415. When the work package is routed to the next work node, the package is typically deleted from the system, and a new work package for the next node is created at step 420. Once all the nodes in the process have been traversed, the process is terminated at step 440.

Figure 12:
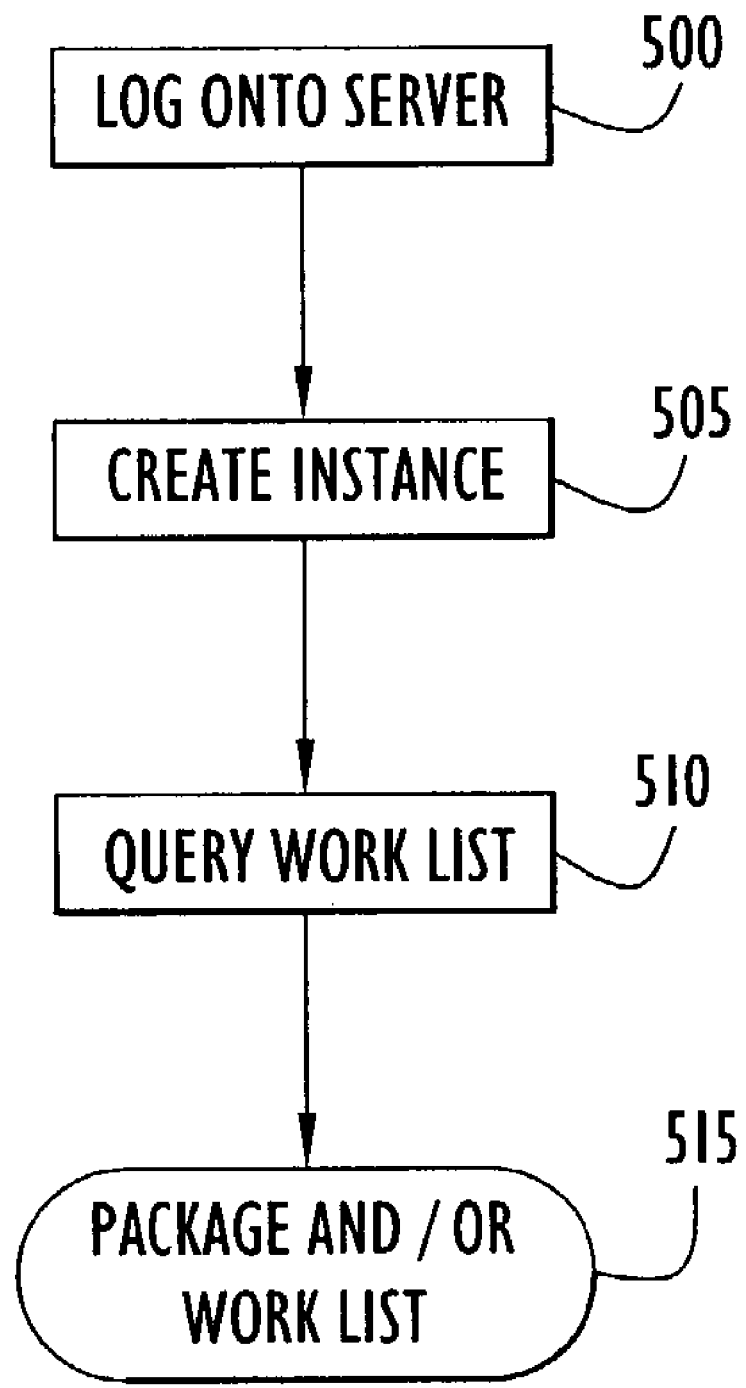
FIG. 12 is a procedural flow chart illustrating the manner in which a work package is queried according to the present invention.

The manner of querying a work package is illustrated in FIG. 12. Specifically, the user logs onto host server 15 (FIG.

1) at step 500 and creates an instance from DKDocRoutingServiceICM class 100 (FIG. 2) at step 505. At step 510, the user may query the work list 140 in such a manner that the response at step 515 is the corresponding work package instance from DKWorkPackageICM class 170 or the worklist instance from DKWorkListICM class 140. For example, a business with multiple employees may use system 10 to manage document routing within the company organization. Each employee is assigned a worklist. At any time, the employee can query their specific worklist. The content of the worklist is work packages requiring the employee's attention. The worklist represents the employee's workload.

It will be appreciated that the embodiments described above and illustrated in the drawings represent only a few of the many ways of implementing a content management system and method of employing extensible workflow entities with user-defined attributes in an object-oriented framework.

The host server and other computer systems may be implemented by any quantity of any personal or other type of computer or processing system (e.g., IBM-compatible, Apple, Macintosh, laptop, palm pilot, microprocessor, etc.). The computer systems may include any commercially available operating system (e.g., Windows, OS/2, Unix, Linux, etc.), any commercially available and/or custom software (e.g., communications software, content management software, document routing software, attribute definition software, etc.) and any types of input devices (e.g., keyboard, mouse, microphone, voice recognition, etc.). It is to be understood that the software of the present invention may be implemented in any desired computer language, and could be developed by one of ordinary skill in the computer and/or programming arts based on the functional description contained herein and the flow charts illustrated in the drawings. Further, any references herein of software performing various functions generally refer to computer systems or processors performing those functions under software control.

The computer systems may alternatively be implemented by hardware or other processing circuitry. The various functions of the present invention may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flow charts and diagrams may be modified in any manner that accomplishes the functions described herein. The present invention is not limited to the entities described above, but may be utilized to provide user-defined attributes for any quantity or types of entities.

The present invention may be implemented as a separate stand-alone program or software module or may be in the form of an embeddable system (e.g., within another system, as an embeddable software component within other software, etc.). The present invention software may be available on a recorded medium (e.g., magnetic or optical mediums, magneto-optic mediums, floppy diskettes, CD-ROM, memory devices, etc.) for use on stand-alone systems or systems connected by a network or other communications medium, and/or may be downloaded (e.g., in the form of carrier waves, packets, etc.) to systems via a network or other communications medium.

The present invention may be implemented in any type of methodology (e.g., object-oriented, etc.), while the various classes and procedures may be arranged and distributed in any fashion among any quantity of classes. The class and other names (e.g., procedure, variable, etc.) are for purposes of illustration, and may be designated by any names or other identifiers. The present invention is not limited to the applications disclosed herein, but may be utilized for any systems or applications employing entities in order to provide user-defined attributes for those entities. Further, user-defined attributes supported by the present invention may be of any quantity, may be associated with any entity and may include any desired characteristic or information (e.g., e-mail or other address, telephone number, department, classification, etc.).

From the foregoing description, it will be appreciated that the invention makes available a novel content management system and method of employing extensible workflow entities with user-defined attributes in an object-oriented framework, wherein attributes for workflow entities may be defined by a user.

Having described preferred embodiments of a new and improved content management system and method of employing extensible workflow entities with user-defined attributes in an object-oriented framework, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A workflow system including a plurality of workflow entities each including a set of fixed and predefined workflow system attributes and enabling a user to define at least one additional attribute other than a predefined workflow system attribute for at least one workflow entity to store custom data and customize said workflow for various applications, said system comprising:

a processor to perform said workflow in accordance with said workflow entities said predefined workflow system attributes and said at least one user-defined attribute, wherein said processor includes:
an attribute module to enable said user to define said at least one additional attribute other than a predefined workflow system attribute for at least one workflow entity to store custom data and customize said workflow, said attribute module including:
an attribute definition module to define said at least one additional attribute for said at least one workflow entity in accordance with a user specification;
an attribute association module to associate each user-defined attribute with a corresponding workflow entity;
an attribute value assignment module to assign a value indicated by said user to a corresponding user-defined attribute; and
an attribute access module to access said value of said at least one user-defined attribute from said corresponding workflow entity for performance of said workflow.

2. The system of claim 1, wherein said workflow system is a document routing service of a content management system, and said at least one workflow entity indicates a routing of documents for performance of said workflow.

3. The system of claim 2, wherein said at least one workflow entity includes a process entity indicating said workflow, a work node entity indicating a step in said workflow and a route list entry entity indicating routing of a document through said work nodes to perform said workflow.

4. The system of claim 1, wherein said attribute module includes a series of application programming interfaces (API) to enable said user to define said at least one additional attribute for said at least one workflow entity to customize said workflow.

5. The system of claim 1, wherein said attribute module is implemented in an object-oriented framework.

6. In a workflow system including a processor and a plurality of workflow entities each including a set of fixed and predefined workflow system attributes, a method of enabling a user to define at least one additional attribute other than a predefined workflow system attribute for at least one workflow entity to store custom data and customize said workflow for various applications comprising:

(a) defining said at least one additional attribute other than a predefined workflow system attribute for said at least one workflow entity in accordance with a user specification to store custom data and customize said workflow;

(b) associating each user-defined attribute with a corresponding workflow entity;

(c) assigning a value indicated by said user to a corresponding user-defined attribute; and (d) performing said workflow, via said processor, in accordance with said workflow entities, said predefined workflow system attributes and said at least one user-defined attribute and accessing said value of said at least one user-defined attribute from said corresponding workflow entity for performance of said workflow.

7. The method of claim 6, wherein said workflow system is a document routing service of a content management system, and said at least one workflow entity indicates a routing of documents for performance of said workflow.

8. The method of claim 7, wherein said at least one workflow entity includes a process entity indicating said workflow, a work node entity indicating a step in said workflow and a route list entry entity indicating routing of a document through said work nodes to perform said workflow.

9. A program product apparatus including a computer recorded medium with computer program logic recorded thereon for enabling a user to define at least one additional attribute other than a predefined workflow system attribute for at least one workflow entity in a workflow system including a processor to store custom data and customize said workflow for various applications, wherein said workflow system includes a plurality of workflow entities each including a set of fixed and predefined workflow system attributes, and performs said workflow in accordance with said workflow entities, said predefined workflow system attributes and said at least one user-defined attribute, said apparatus comprising:

an attribute module to enable said user to define said at least one additional attribute other than a predefined workflow system attribute for at least one workflow entity to store custom data and customize said workflow, said attribute module including:

an attribute definition module to define said at least one additional attribute for said at least one workflow entity in accordance with a user specification;

an attribute association module to associate each user-defined attribute with a corresponding workflow entity;

an attribute value assignment module to assign a value indicated by said user to a corresponding user-defined attribute; and an attribute access module to access said value of said at least one user-defined attribute from said corresponding workflow entity for performance of said workflow.

10. The apparatus of claim 9, wherein said workflow system is a document routing service of a content management system, and said at least one workflow entity indicates a routing of documents for performance of said workflow.

11. The apparatus of claim 10, wherein said at least one workflow entity includes a process entity indicating said workflow, a work node entity indicating a step in said workflow and a route list entry entity indicating routing of a document through said work nodes to perform said workflow.

12. The apparatus of claim 9, wherein said attribute module includes a series of application programming interfaces (API) to enable said user to define said at least one additional attribute for said at least one workflow entity to customize said workflow.

13. The apparatus of claim 9, wherein said attribute module is implemented in an object-oriented framework.

* * * * *